United States Patent

Levinthal et al.

[11] 4,023,935
[45] May 17, 1977

[54] METHOD OF MAKING FINELY PARTICULATE AMMONIUM PERCHLORATE

[75] Inventors: Michael L. Levinthal; Gale F. Allred, both of Brigham City; Larry W. Poulter, Ogden, all of Utah

[73] Assignee: Thiokol Corporation, Newtown, Pa.

[22] Filed: Sept. 15, 1971

[21] Appl. No.: 180,741

[52] U.S. Cl. ............................. 23/302 A; 423/476; 149/76; 62/538
[51] Int. Cl. .............................................. C01c 1/00
[58] Field of Search ............ 23/302, 299; 423/476; 149/2, 76

[56] References Cited
UNITED STATES PATENTS 2,739,873  3/1956  Schumacher ...................... 423/476
3,222,231  12/1965  Markels et al. ...................... 149/2

OTHER PUBLICATIONS

Perry, *Chemical Engineer's Handbook*, 4th Edition, 1963, pp. 17–15.

Primary Examiner—Benjamin R. Padgett
Assistant Examiner—R. E. Schafer

[57] ABSTRACT

A method of making finely particulate ammonium perchlorate which comprises establishing a two-phase liquid system in which the upper phase is a concentrated solution of ammonium perchlorate and the lower phase is a liquid which is immiscible with the upper phase solvent and a non-solvent for ammonium perchlorate. Precipitation of ammonium perchlorate from the solution into the non-solvent is effected by either cooling the solution or evaporating the solvent thereof while subjecting the system to ultra-sonic vibrations. Fine ammonium perchlorate particles collect in the non-solvent phase and are recovered therefrom.

7 Claims, 1 Drawing Figure

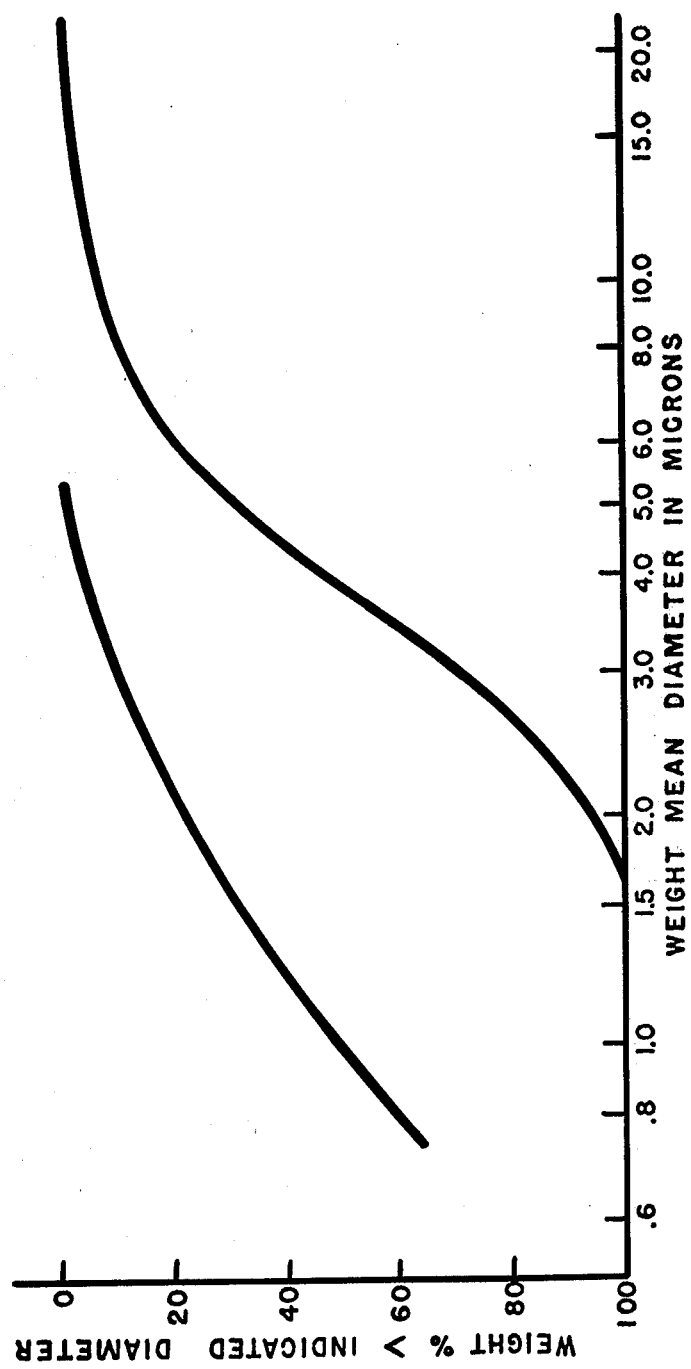

METHOD OF MAKING FINELY PARTICULATE AMMONIUM PERCHLORATE

This invention relates to the manufacture of ammonium perchlorate adapted to be used in rocket propellants, and more particularly, to a novel method of making ammonium perchlorate in the form of ultra-fine particles.

Most solid rocket propellants are principally composed of a polymeric fuel-binder having a finely divided oxidizer, usually ammonium perchlorate, dispersed therein. The oxidizer and certain special purpose ingredients known in the art are dispersed in the polymeric binder while the latter is in viscous fluid form, and the resulting mixture is cast in situ in a rocket motor casing at a temperature sufficient to convert the binder to elastomeric form.

It is known that the efficiency and rate of combustion of a solid propellant can be maximized by increasing the area of contact between the oxidizer and other ingredients of the propellant composition and that this area of contact can be increased by reducing the particle size of the oxidizer. Consequently rocket propellant oxidizers, prior to their incorporation in the fuel-binder, have customarily been subjected to one or more mechanical grinding operations. However, such grinding operations are subject to a number of disadvantages. Thus they involve a considerable explosion hazard and numerous precautions must be taken to minimize the risk of explosion. Moreover, the risk of explosion can never be completely eliminated. Also there is a tendency for the ammonium perchlorate to become contaminated by material removed from the grinder and grinding media. In addition, grinding is a relatively expensive and time-consuming procedure, and it has not been found possible to reduce the particle size of the oxidizer by grinding to the extent that is desirable for highly efficient propellant combustion.

Because of the foregoing disadvantages various proposals have previously been made for producing finely particulate oxidizers other than by grinding. Thus U.S. Pat. No. 3,452,445 discloses a process for making fine particles of ammonium perchlorate by quick freezing of aqueous ammonium perchlorate. Freezing of the aqueous solution is effected by rapidly rotating a flask containing the solution in an acetonedry ice bath. The ice thus formed is then sublimed under a reduced pressure to recover ammonium perchlorate particles having an average size of 1.7 to 2.1 microns.

U.S. Pat. No. 3,222,231 discloses a process wherein a saturated aqueous solution of ammonium perchlorate at a temperature of 95° C. is simultaneously agitated and subjected to ultra-sonic vibrations over a period of several hours. As the solution cools, ammonium perchlorate crystals precipitate and are subsequently removed from the solution, washed with acetone and ether and dried. The product crystals had a particle size within the range 5 to 350 microns.

While such processes avoid the explosion hazards involved in mechanical grinding, the size of the ammonium perchlorate particles they produce is of the same order of magnitude as, or in some cases larger than, those produced by the grinding process. It is accordingly an object of the present invention to provide a process for preparing ultra-fine ammonium perchlorate, i.e., ammonium perchlorate having an average particle size of the order of one micron. It is another object of the invention to provide a process for making ammonium perchlorate which eliminates the explosion hazard involved in the grinding operation referred to above. It is another object of the invention to make finely particulate ammonium perchlorate of high purity at low unit cost. It is still another object of the invention to provide a process wherein for any given production rate the quantity of material being processed is relatively small. Other objects of the invention will be in part obvious and in part pointed out hereafter.

The objects of the invention are achieved, in general, by establishing a two-phase liquid system comprising upper and lower liquid phases that are substantially immiscible with each other, the upper phase of said system being a solution of ammonium perchlorate and the lower phase of said system being a liquid in which ammonium perchlorate is substantially insoluble. The system is subjected to ultra-sonic vibrations while at the same time ammonium perchlorate particles are precipitated from the upper phase solution into the lower phase liquid in which they are insoluble. Precipitation of the ammonium perchlorate particles from the solution can be effected either by vaporization of the ammonium perchlorate solvent or by cooling the solution and/or non-solvent phase.

It has been found that by using a non-solvent phase as described above, growth of the precipitated crystals is arrested and a large proportion of fine particles become suspended in the non-solvent liquid. By the present process ammonium perchlorate particles of an average size of the order of one micron can be readily prepared. Moreover, a relatively high proportion of substantially spherical particles are obtained. Such spherical particles improve the rheological properties of propellant mixtures in which they are incorporated.

The preferred upper phase liquid is water since it is the least expensive suitable solvent and ammonium perchlorate has a favorable solubility-temperature relation when dissolved therein. Liquid ammonia can also be used, but is less desirable because it introduces an explosion hazard.

The lower phase liquid may be any liquid that is a non-solvent for ammonium perchlorate, is substantially immiscible with the upper phase liquid and has a greater specific gravity than the upper phase solution. The preferred lower phase liquids are the halogenated solvents such as methylene chloride, chloroform, perchloroethylene, carbon tetrachloride, trichloroethylene, 1,1,2,trichloro-1,2,2,-trifluoroethane, 1,1,2,2-tetrachloro-1,2-difluoroethane and 1,1-dichloro-1,1,2,2,tetrafluoroethane.

In carrying out the present process as described above the two phase system is placed in a suitable container and subjected to ultra-sonic vibrations for a period which may vary from 2 to 48 hours. Any suitable and well-known type of acoustical generator may be used. The frequency may range from say 10 to 100 kilocycles or higher.

In cases where precipitation of the ammonium perchlorate is effected by vaporization of the upper phase liquid, the vaporization may be caused out at a reduced pressure, as well as at atmospheric pressure. In cases where precipitation is effected by cooling, it is usually desirable to start with a substantially saturated solution of ammonium perchlorate at a temperature near the boiling point of the lower phase liquid and cool the solution to say about 100° F. if natural convection cooling is used. If a coolant is used, the ammonium perchlorate solution may be cooled to a temperature approaching the freezing point of the solution which for aqueous ammonium perchlorate is about 30° F. The solution need not be initially saturated, provided that the initial concentration is sufficiently high to cause an acceptable amount of ammonium perchlorate to precipitate by the end of the cooling period.

When the precipitation and acoustical treatment step of the process has been completed, the lower phase of the system is separated from the upper phase in any suitable manner, as by decantation. It has been found that in the present process a relatively large proportion of the smaller particles remain suspended in the lower phase liquid while the coarser particles tend to settle out. The lower phase liquid and suspended particles can be separated by decantation from the larger particles, and the larger particles recycled, i.e., reused to form an upper phase solution.

The decanted liquid, containing most of the sub-micron particles, can be vaporized to leave a residue of sub-micron ammonium perchlorate particles. Alternatively, if the particles are to be used in a propellant composition, a portion of the non-solvent can be vaporized to form a concentrated slurry or paste which may be mixed directly with the uncured fuel binder and other propellant ingredients. Since most of the lower phase solvents mentioned above are volatile, they evaporate during the mixing operation. The use of the concentrated solvent suspension of sub-micron ammonium perchlorate particles in the propellant mixing operation facilitates homogeneous distribution of the oxidizer particles throughout the mix.

In order to point out more fully the nature of the present invention, the following illustrative Examples are given of embodiments of the present process.

EXAMPLE 1

A container provided with an ultra-sonic generator was charged with 200 ml. of methylene chloride and 200 ml. of a saturated aqueous ammonium perchlorate solution at a temperature of 90° F. An ultra-sonic frequency of 20 kilocycles was used. The ultra-sonic treatment was continued until the temperature of the solution reached 30° F., specifically for a period of 6 hours. The 90° F. temperature was selected because it is just below the boiling point of methylene chloride and the 30° F. temperature was selected because it is just above the freezing point of the aqueous ammonium perchlorate. During cooling of the aqueous phase fine ammonium perchlorate particles were formed as a suspension in the methylene chloride phase.

At the end of 6 hours the methylene chloride phase was separated from the aqueous phase by decantation. Thereafter the methylene chloride was evaporated to recover the ammonium perchlorate particles and the particle size and distribution of the particles were determined with a Model A Coulter counter.

The results obtained are indicated in the annexed drawing wherein Curve A represents the size distribution for the product prepared as described above, whereas Curve B represents the size distribution of ammonium perchlorate ground in a typical mill, specifically a 4" fluid energy mill. It should be noted that the particle size scale in the drawing is a logarithmic scale. It is apparent from Curve A that the particle size of the present product ranged from about 0.6 to 4.5 with about half the particles being of sub-micron size. In contrast, Curve B shows that the mechanically ground particles ranged from about 2 to 20 microns. It is thus evident that the present process is capable of producing ammonium perchlorate having an exceptionally small particle size.

EXAMPLE 2

A container provided with an ultra-sonic generator was charged with 750 ml. of methylene chloride preheated to approximately its boiling point, 6 ml. of lecithin and 750 ml. of a saturated aqueous ammonium perchlorate solution at 90° F. An ultra-sonic frequency of 20 kilocycles was used. The temperature of the material in the tank was gradually reduced by addition of powdered dry ice to about 40° F. The ammonium perchlorate separated out to form a suspension in the methylene chloride layer and a sludge at the bottom of the tank. The aqueous ammonium perchlorate solution was separated by decantation and then the suspension of ammonium perchlorate in methylene chloride was separated from the sludge by decantation. The sludge was found to be composed of ammonium perchlorate particles having a particle size of about 10 microns. The methylene chloride containing the suspended ammonium perchlorate particles was evaporated to yield ammonium perchlorate of which a substantial proportion of the particles were less than one micron.

EXAMPLE 3

A container provided with an ultra-sonic generator was charged with 200 ml. of methylene chloride preheated to about 90° F., 5 ml. of lecithin and 500 ml. of an aqueous solution of ammonium perchlorate saturated at 90° F. An ultra-sonic frequency of 20 kilocycles was used. 500 ml. of methylene chloride at a temperature of about −30° F. was added to the material in the tank through a side arm of the tank, thereby reducing the tank temperature to about 40°F.

This reduction in temperature caused ammonium perchlorate to be precipitated in the methylene chloride layer. As in the procedure of Example 2, a portion of relatively large size ammonium perchlorate particles collected at the bottom of the tank and the remainder of the precipitated ammonium perchlorate remained suspended in the methylene chloride layer.

The aqueous ammonium perchlorate was removed by decantation and thereafter the sludge was separated by decantation from the methylene chloride suspension of ammonium perchlorate particles.

100 grams of the methylene chloride suspension of the ammonium perchlorate particles was mixed with 100 grams of a liquid carboxyl-terminated linear hydrocarbon polymer and the mixture heated to evaporate methylene chloride therefrom. The residue comprised 126 grams of a dispersion of finely-divided ammonium perchlorate in the hydrocarbon polymer suitable for incorporation in a propellant composition.

EXAMPLE 4

A container provided with an ultra-sonic generator was charged with 600 ml. of saturated aqueous ammonium perchlorate at about 90° F. The solution was heated to 105° F. An ultra-sonic frequency of 20 kilocycles was used. 500 ml. of methylene chloride at a temperature of −90° F. was sprayed onto the aqueous solution in the tank and the mixture was allowed to settle for a period of about 10 minutes, during which time ammonium perchlorate particles were precipitated and settled into and through the methylene chloride layer to form a suspension of the ammonium perchlorate particles in the methylene chloride. The methylene chloride suspension was separated by decantation both from the overlying aqueous solution and the sludge of larger ammonium perchlorate particles at the bottom of the tank. Evaporation of the methylene chloride yielded ammonium perchlorate particles of which a substantial proportion were less than one micron.

From the foregoing description it should be apparent that the present process is capable of achieving the objects set forth at the beginning of the present specification. It is, of course, to be understood that the foregoing description is intended to be illustrative only and that numerous changes can be made in the ingredients, proportions and conditions given without departing from the spirit of the invention as defined in the appended claims.

We claim:

1. The method of making ultra-fine particle size ammonium perchlorate which comprises establishing a two-phase liquid system comprising upper and lower liquid phases that are substantially immiscible with each other, the upper phase of said system being a solution of ammonium perchlorate and the lower phase of said system being a liquid in which ammonium perchlorate is substantially insoluble, subjecting said system to ultra-sonic vibrations and simultaneously precipitating ammonium perchlorate particles from said upper phase by cooling said upper phase or vaporizing the liquid thereof to cause fine ammonium perchlorate particles to collect in said lower phase liquid, separating said lower phase liquid from said upper phase liquid, and vaporizing the liquid of said lower phase to recover said ammonium perchlorate particles therefrom.

2. A method according to claim 1 wherein said lower phase liquid after separation from the upper phase liquid is filtered to remove coarse particles of ammonium perchlorate therefrom before said lower phase liquid is vaporized.

3. A method according to claim 1 wherein ammonium perchlorate particles are precipitated from said upper phase by vaporizing the liquid thereof.

4. A method according to claim 1 wherein ammonium perchlorate particles are precipitated from said upper phase by cooling of said upper phase.

5. A method according to claim 4 wherein said upper phase solution is a saturated aqueous solution of ammonium perchlorate and the solution is cooled from a temperature near the boiling point of said lower phase liquid to a temperature near the freezing point of said aqueous solution to precipitate ammonium perchlorate particles from said solution.

6. A method according to claim 1 wherein the upper phase of said system is an aqueous solution of ammonium perchlorate and the lower phase of said system is a halogenated solvent.

7. A method according to claim 6 wherein the lower phase of said system is methylene chloride.

* * * * *